United States Patent
Dobson, Jr. et al.

(10) Patent No.: US 6,325,149 B1
(45) Date of Patent: Dec. 4, 2001

(54) METHOD OF DECREASING THE LOSS OF FLUID DURING WORKOVER AND COMPLETION OPERATIONS

(75) Inventors: James W. Dobson, Jr.; Jesse Clark Harrison, III, both of Houston; Herman Mathieu Muijs, The Woodlands, all of TX (US)

(73) Assignee: Texas United Chemical Company, LLC., Houston, TX (US)

( * ) Notice: Subject to any disclaimer, the term of this patent is extended or adjusted under 35 U.S.C. 154(b) by 0 days.

(21) Appl. No.: 09/510,320

(22) Filed: Feb. 22, 2000

(51) Int. Cl.[7] .................................................. E21B 43/16
(52) U.S. Cl. ..................... 166/305.1; 166/278; 507/266
(58) Field of Search .................................. 166/276, 278, 166/291, 305.1, 308, 312; 507/266, 277

(56) References Cited

U.S. PATENT DOCUMENTS

| | | | |
|---|---|---|---|
| 4,046,197 | * 9/1977 | Gruesbeck et al. | 166/305.1 |
| 4,963,273 | * 10/1990 | Perricone et al. | 507/136 |
| 5,783,526 | * 7/1998 | Dobson et al. | 507/261 |
| 5,785,747 | * 7/1998 | Vollmet et al. | 106/194.2 |
| 6,148,917 | * 11/2000 | Brookey et al. | 106/301 |
| 6,196,320 | * 3/2001 | Ray et al. | 166/312 |

* cited by examiner

*Primary Examiner*—David Bagnell
*Assistant Examiner*—Jennifer R. Dougherty
(74) *Attorney, Agent, or Firm*—Roy F. House

(57) ABSTRACT

The invention provides solids-free, viscous fluids (pills) for use in various well workover and completion operations including as displacement spacer pills, standard fluid loss control pills, post gravel pack in-screen pills, perforation sealing, and the like. The pills comprise a viscous solution of a polyethylene glycol having a molecular weight of 1,000 to 8,000,000 in an aqueous liquid comprising a solution of one or more soluble bromide salts having a density sufficient to provide the desired hydrostatic pressure at the location of use of the fluid in a well. The minimum concentration of the polyethylene glycol in the pill varies with the average molecular weight as follows: MW=1,000 to 10,000=100 ppb; MW=10,001 to 100,000=75 ppb; MW=100,001 to 250,000=50 ppb; MW=250,001 to 500,000=10 ppb; MW=500,001 to 8,000,000=5 ppb.

21 Claims, No Drawings

METHOD OF DECREASING THE LOSS OF FLUID DURING WORKOVER AND COMPLETION OPERATIONS

The invention relates to improvements in a fluid for and a process of controlling fluid loss to a formation during workover and completion operations, and in a fluid for and a process of preventing the mixing of fluids within a borehole.

BACKGROUND OF THE INVENTION

In the drilling and servicing of oil and gas wells, there are numerous operations that require a viscous fluid, such as the control of the loss of fluid from the fluid present in the borehole of the well to the surrounding subterranean formations contacted by the borehole, or the mixing of fluids within the borehole. Such operations include drilling, fracturing, gravel packing, workover, and other completion operations.

The present invention relates to the use of certain novel pills to control the fluid loss in such operations.

PRIOR ART

Situations arise in completion operations requiring effective fluid loss control. In the past, controlling fluid loss during completions in unconsolidated reservoirs has been an art and not a science. Industry has induced major formation damage in the interest in economy and safety of well operations. As well productivity issues receive more attention, engineers and scientists have turned a more critical eye to the behavior of fluid loss control systems.

Completion fluids are designed based upon the anticipated reservoir pressure to create a determined overbalanced condition. The presence of high reservoir permeability can result in significant losses of completion fluids under these conditions. Before coming out of the hole with a bottom hole assembly, it is necessary to minimize fluid loss to less than five barrels per hour, preferably less than one barrel per hour. The concept of fluid loss involves the reduction of the effective permeability and/or an increase in the viscosity of the leak off fluid. A combination of a particle and a viscous fluid is the widely accepted approach to controlling fluid loss.

Difficulty arises when it is desired to regain the permeability in the formation. Clean up efficiency depends upon both the fluid and the particle. Materials such as salt, oil soluble resins and calcium carbonate suspended in viscosified polymer solutions are the most common completion fluids used in fluid loss control. Removal of these materials in order to reestablish fluid loss for gravel packing or increase hydrocarbon production typically involves treatment with an acid or hydrocarbon fluid to dissolve the solids material thereon. At best, clean up efficiency is in the range of 10 to 50 percent for typical systems. Such leak off control materials have been found to be nearly impossible to remove from perforation tunnels against the formation in the reinjection direction. Filter cakes deposited by these particulate systems provide leak off rates that are too low to permit contact by solvents or solids in order to affect their removal. Polymer systems alone allow more effective removal but the fluid loss efficiency is considerably lower thereby allowing unacceptable fluid loss rates when leak off control is desired.

The following papers published by the Society of Petroleum Engineers provide further background for the invention and the prior art: SPE 39438, "Development of a New Crosslinked-HEC Fluid Loss Control Pill for Highly-Overbalanced, High Permeability and/or High Temperature Formations," F. F. Chang et al.; SPE 10666, "Guidelines for Using HEC Polymers for Viscosifying Solids-Free Completion and Workover Brines", R. F. Scheuerman, both incorporated herein by reference.

Situations also arise in which a viscous fluid is required to prevent the mixing of fluids within a borehole, so-called displacement or spacer fluids.

SUMMARY OF THE INVENTION

The invention provides solids-free viscous fluids, typically pills, which are less damaging to a producing formation during workover and completion operations. The fluids comprise an aqueous liquid comprising a solution of one or more soluble bromide salts having dissolved therein a polyethylene glycol at a concentration such that a viscous solution is obtained.

Thus it is an object of the invention to provide aqueous solids-free viscous fluids containing a viscosifying concentration of a polyethylene glycol.

It is another object of the invention to provide aqueous solids-free viscous fluids which are less damaging to a producing formation.

It is another object of the invention to provide aqueous, solids free, viscous fluids which are useful in various oil and gas well workover and completion operations wherein the aqueous fluid comprises a brine having a density from about 11.0 to about 20 lbm/gal.

It is still another object of the invention to provide a process for reducing the pressure differential required to remove a fluid loss pill from a producing formation which comprises utilizing as the fluid loss pill a viscous aqueous solution of one or more soluble bromide salts and a polyethylene glycol.

Another object of the invention is to provide a method of decreasing the loss of fluid to a hydrocarbon producing formation during workover or completion operations, particularly such operations which require a post gravel pack in-screen fluid, a fluid loss control pill, perforation sealing, and the like.

Yet another object of the invention is to provide a method of decreasing the mixing of fluids within a borehole.

These and other objects of the invention will be obvious to one skilled in the art on reading this specification and the appended claims.

While the invention is susceptible of various modifications and alternative forms, specific embodiments thereof will hereinafter be described in detail and shown by way of example. It should be understood, however, that it is not intended to limit the invention to the particular forms disclosed, but on the contrary, the invention is to cover all modifications and alternatives falling within the spirit and scope of the invention as expressed in the appended claims.

The compositions can comprises, consist essentially of, or consist of the stated materials. The method can comprise, consist essentially of, or consist of the stated steps with the stated materials.

DESCRIPTION OF THE PREFERRED EMBODIMENTS

Solids-free fluid loss control pills are typically compounded with a viscosifying polysaccharide such as hydroxyethyl cellulose. Sheared and hydrated into various brines, these pills are pumped into porous media such as reservoir or gravel pack sands where the viscosity reduces the rate of fluid loss. However, the polysaccharides used in such pills have proven to be damaging to the permeability of the sands and difficult to remove therefrom.

The present invention provides a solids-free, polymer-free, viscous pill which can be utilized in the same manner as the prior polysaccharide containing viscous pill. The viscous pill of the present invention comprises an aqueous liquid comprising a solution of one or more soluble bromide salts having dissolved therein a polyethylene glycol having a molecular weight from about 1000 to about 8,000,000.

By the term "solids-free" as used herein is meant that the viscous fluids of the invention contain no added water-insoluble solids. Thus the fluids may contain water soluble salts dissolved in the aqueous phase of the fluid. By the term "polymer-free" as used herein is meant that the fluids contain no polymers hydrated therein, such as polysaccharides and the like, i.e., the well known so-called "water soluble polymers", other than the polyethylene glycols of this invention.

The solids-free pills of this invention are less damaging to the hydrocarbon-containing formations contacted by the pill. The polyethylene glycol adsorbs onto the surface of clays within the formations, stabilizing the clays as the pill is placed, thus reducing damage to the formation. The polyethylene glycol readily degrades over time, particularly at the higher temperatures within the formation. The viscous pill thermally loses viscosity with time, and also upon dilution with produced formation water, such that no acid clean up is required. Moreover, the pressure differential required to remove the pill from the surface of the hydrocarbon-containing formation is reduced, as compared to the prior art pills, since the polyethylene glycol does not adhere to sand or metal.

The solids-free viscous fluids of this invention can be utilized in a variety of workover and completion operations including displacement spacer pills, standard fluid loss control pills, post gravel pack in-screen pills, perforation sealing, and the like.

As indicated, the solids-free viscous fluids of the present invention comprise an aqueous bromide solution having solubilized therein a polyethylene glycol having a molecular weight from about 1000 to about 8,000,000.

The aqueous liquid used to prepare the fluids of this invention is a solution of one or more soluble bromide salts in which the polyethylene glycol is soluble at the desired temperature of the fluid. Such brines are well known in the art. They are generally utilized in solids-free fluids since the density of the fluid can be adjusted as desired and necessary during workover and completion operations by adjusting the concentrations of the dissolved zinc bromide and calcium bromide. The concentration of the bromide salts present in the brine may be any concentration up to the saturation concentration (i.e., the concentration of water soluble salt above which no more of the water soluble salt can be dissolved at the temperature of the brine) provided the polyethylene glycol is soluble in the brine at the desired temperature of the fluid. The solids-free fluid loss control fluid will generally have a density from about 11.0 ppg to about 20 ppg, preferably from about 14 ppg to about 20 ppg. Representative water soluble bromide salts include sodium bromide, potassium bromide, calcium bromide, zinc bromide, and mixtures thereof.

For well control, industry commonly designs for an overbalance of 200 to 500 psi. The fluid density desired is obtained by adjusting the concentrations of dissolved zinc bromide and calcium bromide as is known in the art.

The soluble polyethylene glycols useful in the fluids of this invention have an average molecular weight from about 1,000 to about 8,000,000, preferably from about 5,000 to about 8,000,000.

The concentration of polyethylene glycol in the fluids is dependent upon the composition of the aqueous liquid, and on the viscosity and degree of fluid loss control desired. Generally the viscosity of the fluid increases and the rate of fluid loss decreases as the molecular weight of the polyethylene glycol increases. Thus the concentration of polyethylene glycol required to achieve a desired viscosity and/or rate of fluid loss decreases as the molecular weight of the polyethylene glycol increases. In general, the minimum concentration of the polyethylene glycol in the pill varies with the average molecular weight as follows: MW=1,000 to 10,000=100 ppb; MW=10,001 to 100,000=75 ppb; MW=100,001 to 250,000=50 ppb; MW=250,001 to 500,000=10 ppb; MW=500,001 to 8,000,000=5 ppb.

In general, the maximum concentration of the polyethylene glycol in the fluid is as follows: MW=1,000 to 10,000= 250 ppb; MW=10,001 to 100,000=150 ppb; MW=100,001 to 250,000=100 ppb; MW=250,001 to 500,000=75 ppb; MW=500,001 to 8,000,000=15 ppb.

When the fluid is to be used at elevated temperatures, it is desirable to incorporate an oxygen scavenger in the fluids. A preferred oxygen scavenger is ammonium bisulfite. Other well known oxygen scavengers which may be used in the fluids include other bisulfites, sulfites, thiosulfates, hydrazine and hydrates thereof, and organo-phosphonates.

The solids-free viscous fluids are useful as solids-free fluid loss control pills designed to limit the volumetric ratio of flow of fluid under constant pressure through a sand producing reservoir of dimensional thickness by increasing the viscosity of the base fluid. Typically in prior art hydroxyethylcellulose (HEC) viscosified fluids, the concentration of HEC is 4 to 5 ppb. A typical pill spotting procedure is as follows:

1. Check for wellhead pressure.
2. Pump brine to establish an overbalance toward the formation if necessary.
3. Pump pill.
4. Monitor pump pressure closely.
5. Maintain a constant pressure while pumping at 2–5 bpm.
6. When an increase in pressure is indicated, stop pumping.
7. Monitor wellbore for losses.
8. If no losses are detected, wait one hour and fill the wellbore with brine.

The solids-free viscous fluids are also useful as displacement spacer fluids. Most drilling muds are incompatible with solids-free brines and must be prevented from mixing. Hence, effective displacement spacers are designed to:

1. Remove mud, mud solids, and other contaminants from the wellbore.
2. Maintain the integrity of the mud and the brine.
3. Reduce brine filtration time and cost.

Typical Water-Base Displacement Procedure:

1. Pre-displacement—condition the mud to be displaced.
2. Displacement
   a. Viscous brine spacer between the mud and the brine.
   b. Circulate with brine until contaminants are less than 1000 ppm.
   c. Circulate chemical wash.
   d. Prepare and pump a viscous brine spacer.
   e. Follow with clean completion brine.
   f. Circulate and filter the completion brine until turbidity of the returns is less than 60 NTU.

Typical Oil-Base Displacement Procedure:
1. Pre-displacement—condition the mud to be displaced.
2. Displacement
   a. Pump oil and chemical wash as spacer between the mud and the brine.
   b. Circulate with brine until contaminants are less than 1000 ppm.
   c. Circulate chemical wash.
   d. Prepare and pump a viscous brine spacer.
   e. Displace the spacers with completion brine.
   f. Circulate and filter the completion brine until the turbidity of the returns is less than 60 NTU.

As indicated herein, the solids-free viscous fluids are useful as post gravel pack in-screen pills. After sand control screen placement and gravel packing, fluid loss control fluids (pills) may be utilized to control loss of completion brine through the screen, gravel pack, and into the formation. These pills are essential to control fluid losses, thereby allowing removal of the workstring. A mechanical closure assembly termed a "flapper valve" is sometimes incorporated, but the failure rate is quite high, therefore fluid loss control pills are mixed as a standby should the flapper valve fail to close. Fluid loss control pills may be of three main types:
   1. Solids-Laden: Solids sized to bridge inside the screen.
   2. Crosslinked Polymer: Designed to seal inside the gravel and formation.
   3. Viscous Brines: Seal inside the gravel and formation A typical spotting procedure for the in-screen pills of this invention is as follows:
   1. In the circulating position, pills are normally spotted down the tubing and into the annulus to an approximate 5 bbl volume above the packer assembly.
   2. The washpipe is then pulled allowing the pill to move into the screen under the force of gravity.
   3. The well is monitored for losses.
   4. If no losses are detected, wait one hour, fill well with brine, and pull the workstring.

The invention will be understood in light of the following specific examples, which are merely illustrative and should not be construed as limiting the invention in any respect, as will be evident to those skilled in the art.

In the examples to follow, the procedure used to determine the fluid loss is as follows: (1) to a standard API low pressure, low temperature fluid loss cell is added 400 grams of a sand having a particle size in the range from 80 mesh (180 micrometers) to 120 mesh (125 micrometers); (2) one barrel equivalent (350 ml) of the fluid is carefully added to the cell; (3) the cell is closed and 100 psi supplied by nitrogen is applied to the cell; (4) the time for the fluid to flow through the sand bed is measured.

In these examples and this specification, the following abbreviations may be used: API=American Petroleum Institute; PEG=polyethylene glycol; LSRV=Brookfield low shear rate viscosity at 0.3 revolutions per minute (0.0636 sec$^{-1}$) in centipoise; PV=plastic viscosity in centipoise; YP=yield point in pounds per 100 square feet; lbm=pound; gal=U.S. gallon; MW=molecular weight; ppb=pounds per 42 gallon barrel; ppg=pounds per gallon; psi=pounds per square inch; NTU=nephelometer turbidity units; sec= seconds; rpm=revolutions per minute; bpm=barrels per minute; ppm=parts per million. The plastic viscosity and yield point were obtained by the procedures set forth in API's Recommended Practice 13 B-1.

EXAMPLES 1–4

Solutions in two NaBr brines and two $ZnBr_2/CaBr_2$ were prepared containing either 131 ppb polyethylene glycol of MW=8000, or 10 ppb polyethylene glycol of MW=400,000, as set forth in Table A. The fluids were evaluated for Fann rheology, LSRV, pH, and fluid loss. The data obtained are set forth in Table A.

TABLE A

Solids-Free Fluid Loss Control Pills

| Example | 1 | 2 | 3 | 4 |
|---|---|---|---|---|
| 11.5 ppg NaBr Brine, ml (bbl) | 350(1) | 0 | 0 | 0 |
| 12.5 ppg NaBr Brine, ml (bbl) | 0 | 350(1) | 0 | 0 |
| 17.0 ppg $ZnBr_2/CaBr_2$ Brine, ml (bbl) | 0 | 0 | 350(1) | 0 |
| 18.0 ppg $ZnBr_2/CaBr_2$ Brine, ml (bbl) | 0 | 0 | 0 | 350(1) |
| PEG 8000, g or ppb | 131 | 131 | 0 | 0 |
| PEG 400,000, g or ppb | 0 | 0 | 10 | 10 |
| Fann Rheology | | | | |
| 600 rpm | 142 | 111 | OS | OS |
| 300 rpm | 72 | 56 | 250 | OS |
| 200 rpm | 48 | 38 | 183 | — |
| 100 rpm | 25 | 19 | 106 | 158 |
| 6 rpm | 2 | 1.5 | 8 | 13 |
| 3 rpm | 1 | 1 | 4 | 6 |
| PV | 70 | 55 | — | — |
| YP | 2 | 1 | — | — |
| pH | 6.7 | 7.3 | 4.2 | 2.7 |
| LSRV | 0 | 0 | 0 | 0 |
| Fluid Loss, sec. | 22 | 24 | 117 | 264 |

What is claimed is:

1. A method of decreasing the loss of fluid to a hydrocarbon producing formation during workover or completion operations which comprises pumping a solids-free, viscous, fluid loss control fluid to the location in a borehole where the workover or completion operation is to be conducted, wherein the solids-free, viscous, fluid loss control fluid comprises an aqueous liquid comprising a solution of one or more soluble bromide salts having dissolved therein one or more polyethylene glycols having an average molecular weight from about 1,000 to about 8,000,000, wherein the minimum concentration of the polyethylene glycol in the fluid varies with the average molecular weight as follows: MW=1,000 to 10,000=100 ppb; MW=10,001 to 100,000=75 ppb; MW=100,001 to 250,000=50 ppb; MW=250,001 to 500,000=10 ppb; MW=500,001 to 8,000,000=5 ppb.

2. The method of claim 1 which additionally contains an oxygen scavenger.

3. The method of claim 2 wherein the aqueous liquid has a density from about 11 ppg to about 20 ppg.

4. The method of claim 3 wherein the aqueous liquid has a density greater than about 14 ppg.

5. The method of claim 1 wherein the aqueous liquid has a density from about 11 ppg to about 20 ppg.

6. The method of claim 5 wherein the aqueous liquid has a density greater than about 14 ppg.

7. The method of claim 1; 2, 3, 4, 5, or 6 wherein the operation requires a post gravel pack in-screen fluid.

8. A method of decreasing the loss of fluid to a hydrocarbon-containing formation during workover or completion operations which comprises pumping a solids-free, viscous, fluid loss control fluid to the location in a borehole where the workover or completion operation is to be conducted, wherein the solids-free, viscous, fluid loss control fluid comprises an aqueous liquid comprising a solution of one or more soluble bromide salts having dissolved therein one or more polyethylene glycols having an average molecular weight from about 1,000 to about 8,000,000, wherein the minimum concentration of the polyethylene glycol in the fluid varies with the average molecular weight as follows: MW=1,000 to 10,000=100 ppb; MW=10,001 to 100,000=75 ppb; MW=100,001 to 250,000=50 ppb; MW=250,001 to 500,000=10 ppb; MW=500,001 to 8,000,000=5 ppb.

9. The method of claim 8 which additionally contains an oxygen scavenger.

10. The method of claim 9 the aqueous liquid has a density from about 11 ppg to about 20 ppg.

11. The method of claim 10 wherein the aqueous liquid has a density greater than about 14 ppg.

12. The method of claim 8 the aqueous liquid has a density from about 11 ppg to about 20 ppg.

13. The method of claim 12 wherein the aqueous liquid has a density greater than about 14 ppg.

14. The method of claim 8, 9, 10, 11, 12, or 13 wherein the operation requires a post gravel pack in-screen fluid.

15. A method of decreasing the loss of fluid to a hydrocarbon-containing formation during workover or completion operations which comprises pumping a solids-free, polymer-free, viscous, fluid loss control fluid to the location in a borehole where the workover or completion operation is to be conducted, wherein the solids-free, viscous, fluid loss control fluid comprises an aqueous liquid comprising a solution of one or more soluble bromide salts having dissolved therein one or more polyethylene glycols having an average molecular weight from about 1,000 to about 8,000,000, wherein the minimum concentration of the polyethylene glycol in the fluid varies with the average molecular weight as follows: MW=1,000 to 10,000=100 ppb; MW=10,001 to 100,000=75 ppb; MW=100,001 to 250,000=50 ppb; MW=250,001 to 500,000=10 ppb; MW=500,001 to 8,000,000=5 ppb.

16. The method of claim 15 which additionally contains an oxygen scavenger.

17. The method of claim 16 the aqueous liquid has a density from about 11 ppg to about 20 ppg.

18. The method of claim 17 wherein the aqueous liquid has a density greater than about 14 ppg.

19. The method of claim 15 the aqueous liquid has a density from about 11 ppg to about 20 ppg.

20. The method of claim 19 wherein the aqueous liquid has a density greater than about 14 ppg.

21. The method of claim 15, 16, 17, 18, 19, or 20 wherein the operation requires a post gravel pack in-screen fluid.

* * * * *